(12) United States Patent
Kakitsuba (10) Patent No.: US 11,354,550 B2
(45) Date of Patent: Jun. 7, 2022

(54) INFORMATION PROCESSING APPARATUS, AND NON-TRANSITORY COMPUTER-READABLE RECORDING MEDIUM THEREFOR

(71) Applicant: Brother Kogyo Kabushiki Kaisha, Nagoya (JP)

(72) Inventor: Ryota Kakitsuba, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/305,726

(22) Filed: Jul. 14, 2021

(65) Prior Publication Data

US 2022/0019864 A1    Jan. 20, 2022

(30) Foreign Application Priority Data

Jul. 16, 2020   (JP) .............................. JP2020-121829

(51) Int. Cl.
*G06F 3/12*    (2006.01)
*G06K 15/02*   (2006.01)
*G06K 15/00*   (2006.01)
*G06K 15/16*   (2006.01)

(52) U.S. Cl.
CPC ......... *G06K 15/022* (2013.01); *G06K 15/002* (2013.01); *G06K 15/16* (2013.01); *G06K 15/1809* (2013.01); *G06K 15/408* (2013.01)

(58) Field of Classification Search
CPC .... G06K 15/022; G06K 15/002; G06K 15/16; G06K 15/1809; G06K 15/408
See application file for complete search history.

(56) References Cited

U.S. PATENT DOCUMENTS

| | | | |
|---|---|---|---|
| 6,762,771 B1* | 7/2004 | Niki ...................... | G06F 3/1204 358/1.13 |
| 2005/0111015 A1* | 5/2005 | Tsujimoto ............. | G06F 3/1208 358/1.9 |
| 2005/0200861 A1 | 9/2005 | Kubota | |
| 2007/0185979 A1* | 8/2007 | Yoshida ................ | G06F 3/1285 709/220 |
| 2009/0180140 A1* | 7/2009 | Kawamura ........... | G06F 3/1284 358/1.15 |

FOREIGN PATENT DOCUMENTS

JP     2005-115528 A1    4/2005

* cited by examiner

*Primary Examiner* — Huo Long Chen
(74) *Attorney, Agent, or Firm* — Burr & Brown, PLLC (57) ABSTRACT

According to aspects of the present disclosure, a CPU of a PC is configured to obtain a print settings used for printing by a printer. The print settings includes an item for a sheet size including a sheet length and an item for a print quality. A parameter settable to the print quality includes a parameter (e.g., a normal or high speed) corresponding to a high conveyance speed of a sheet and a parameter (e.g., a high or the highest image quality) corresponding to a low conveyance speed. When the sheet length of the obtained print size is longer than a particular length, a parameter to be set to the print quality is limited to the high image quality or the highest image quality, and otherwise, the parameter is not limited.

11 Claims, 7 Drawing Sheets

INFORMATION PROCESSING APPARATUS, AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2020-121829 filed on Jul. 16, 2020. The entire subject matter of the application is incorporated herein by reference.

BACKGROUND

Technical Field

The present disclosures relate to an information processing apparatus configured to receive an input of print settings, and a non-transitory computer-readable recording medium containing instructions which cause, when executed by a controller, the information processing apparatus to receive and process the print settings.

Related Art

In a field of information processing apparatuses such as personal computers, there are known technologies for receiving print settings used for printing performed by a printer and instructing the printer to perform printing based on the print settings. For example, there is known a conventional art disclosing a technology regarding print settings for printing which is performed by a printer configured to print on a continuous sheet such as a roll sheet.

SUMMARY

When a printer that supports printing on cut sheets of a fixed size also supports continuous sheets such as a roll sheet or a long cut sheet, the following problems may arise. When printing is performed using the continuous sheet or the long cut sheet, disorders (e.g., printing failure) associated with the conveyance of the sheet are more likely to occur in comparison with a case where a standard size cut sheet is used.

According to aspects of the present disclosures, there is provided a non-transitory computer-readable recording medium of an image processing apparatus that includes a controller, the recording medium storing instructions which can be executed by the controller, the instructions causing, when executed by the controller, the information processing apparatus to perform obtaining print settings to be used in printing by a printer, the print setting including a sheet size and a particular item, the sheet size including a sheet length representing a size in a sheet conveyance direction of a sheet in the printer, a parameter that can be set to the particular item including a first parameter corresponding to a first mode in which an abnormality in a conveyance of the sheet in the printer is prevented at a first effectiveness level and a second parameter corresponding to a second mode in which the abnormality in the conveyance of the sheet in the printer is prevented at a second effectiveness level which is higher than the first effectiveness level, and limiting the parameter to be set to the particular item to the second parameter in a case where the sheet length included in the sheet size among the print settings as obtained is longer than a particular length, and not limiting the parameter to be set to the particular item to the second parameter in a case where the sheet length included in the sheet size among the print settings as obtained is not longer than the particular length.

According to aspects of the present disclosures, there is provided an information processing apparatus including a controller and configured to communicate with a printer. The controller is configured to perform obtaining print settings to be used in printing by a printer, the print setting including a sheet size and a particular item, the sheet size including a sheet length representing a size in a sheet conveyance direction of a sheet in the printer, a parameter that can be set to the particular item including a first parameter corresponding to a first mode in which an abnormality in a conveyance of the sheet in the printer is prevented at a first effectiveness level and a second parameter corresponding to a second mode in which the abnormality in the conveyance of the sheet in the printer is prevented at a second effectiveness level which is higher than the first effectiveness level, and limiting the parameter to be set to the particular item to the second parameter in a case where the sheet length included in the sheet size among the print settings as obtained is longer than a particular length, and not limiting the parameter to be set to the particular item to the second parameter in a case where the sheet length included in the sheet size among the print settings as obtained is not longer than the particular length.

DESCRIPTION OF THE EMBODIMENT

Hereinafter, a non-transitory computer-readable recording medium storing instructions, which can be executed by a controller of a PC that is connectable to an image forming apparatus, will be described with reference to the accompanying drawings.

Figure 1:
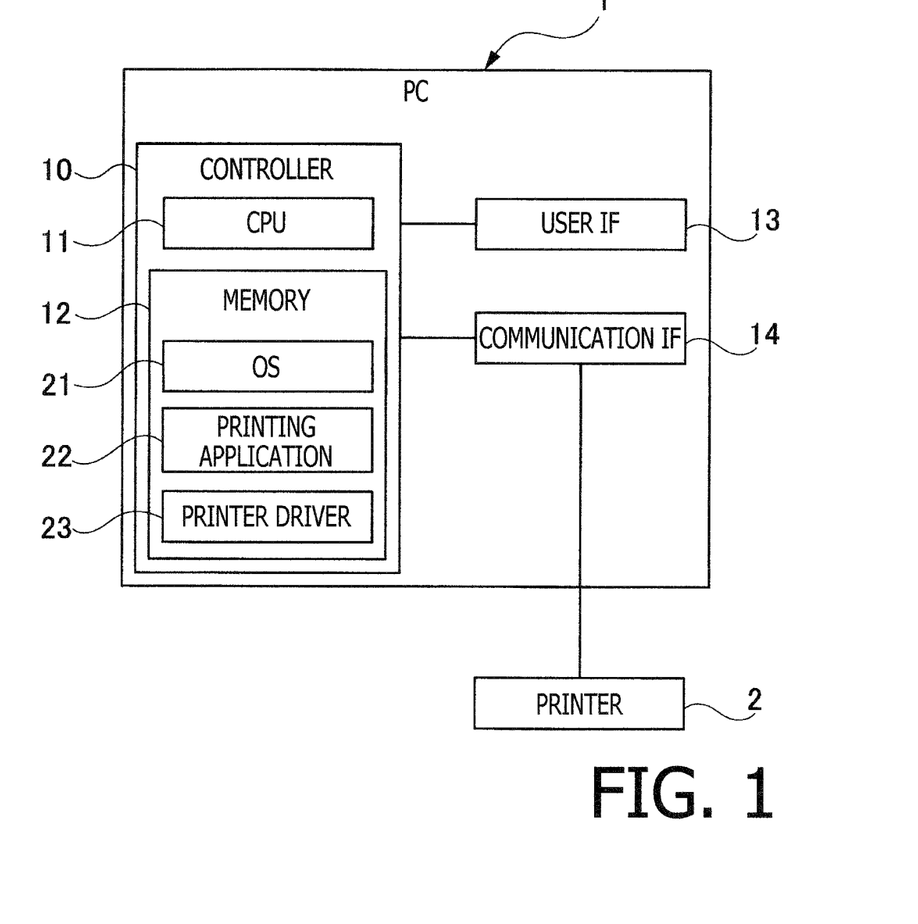
FIG. 1 is a block diagram schematically showing a hardware configuration of a PC according to an embodiment of the present disclosures.

The PC 1 according to the present embodiment is configured to be connected to a printer 2 so as to communicate with each other, as shown in FIG. 1. The PC 1 is configured to execute various application programs (hereinafter, simply referred to as "applications") to make the printer 2 perform various functions.

As shown in FIG. 1, the PC 1 is equipped with a controller 10 that includes a CPU 11 and a memory 12. The PC 1 also has a user interface (hereinafter, referred to as a "user IF") 13 and a communication interface (hereinafter, referred to as a "communication IF") 14, which are electrically connected to the controller 10. It is noted that the controller 10 in FIG. 1 is a generic term for the hardware and software used to control the PC 1, and does not necessarily represent a single piece of hardware that actually exists in the PC 1.

The CPU 11 executes various processes according to programs retrieved from the memory 12 and based on user's operations. The memory 12 is a flash memory such as a ROM, a RAM and/or an HDD, and is used as an area that stores data including various programs, image data, text data and setting information.

An example of the memory may be a computer-readable storage medium. The computer-readable storage medium is a non-transitory medium. The non-transitory medium includes recording media such as CD-ROMs, DVD-ROMs and the like, in addition to the above examples. Further, the non-transitory media also include a tangible medium. On the other hand, an electrical signal carrying a program that is downloaded from a server on the Internet and the like, is a computer-readable signal medium, which is a kind of computer-readable medium, but is not included in the non-transitory computer-readable storage media.

The user IF 13 includes hardware configured to display information on a screen and hardware configured to receive input operations by the user. The user IF 13 may be a combination of a display, a keyboard, a mouse and the like, or a touch panel having a display function and an input function.

The communication IF 14 includes hardware configured to communicate with external devices such as the printer 2. A communication method of the communication IF 14 may be any standard method, such as Wi-Fi (registered trademark), Bluetooth (registered trademark), USB, and the like. It is noted that the communication IF 14 may support multiple communication methods.

In the memory 12 of the PC 1 according to the present embodiment, an operating system (hereinafter, referred to as an "OS") 21, a printing application 22, and a printer driver 23 are stored as shown in FIG. 1. The OS 21 is, for example, Windows (registered trademark), mac OS (registered trademark), iOS (registered trademark), Android (registered trademark), Linux (registered trademark) and the like.

The printing application 22 is a program that receives and processes user's instructions regarding printing. The printing application 22 receives, for example, a designation of a device configured to perform printing, a designation of an image to be printed, instructions to edit print settings, and instructions to perform printing, in accordance with the user's operations. The printing application 22 may further receive a designation of the sheet type and sheet size used for printing, a designation of print quality, instructions for setting margins, and the like.

The printer driver 23 is a program that corresponds to the model of the printer 2 and has functions to control the operation of the printer 2. The printer driver 23 is started, for example, when an instruction to execute printing by the printer 2 or an instruction to edit detailed print settings is received from the printing application 22 or the like, or when an instruction to set the properties of the printer 2 is received from the OS 21. The printer driver 23 generates print data based on the image data designated in the print job in response to receipt of the print job from, for example, the OS 21.

The printer driver 23 includes a plurality of items as print settings for printing with use of the printer 2, and receives user selections from among the parameters that can be set for each item. The print setting items include, for example, a sheet type, a sheet size, a print quality, a color setting, and a sheet feeding method. The printer driver 23 receives, as a parameter for the sheet size item, a user selection of one of a fixed size such as A4, a user-defined size having been registered, or registration of a user-defined size. In the following description, among the sheet size information included in the print settings, the size in a sheet conveying direction in the printer 2 is referred to as a "sheet length" and the size in a direction perpendicular to the sheet length is referred to as a "sheet width."

The printer 2 has, at least, a printing function and a communication function to communicate with the PC 1. Further, the printer 2 has a multi-purpose sheet tray (hereinafter, referred to as an "MP tray") as a sheet tray, in addition to a regular tray configured to accommodate cut sheets of a standard size. The MP tray of the printer 2 is a sheet feed tray configured to feed not only sheets having sizes that can be fed from the regular tray, but also a long cut sheet, which has a sheet length longer than the sheet length of the standard size sheet, and a roll paper, which is continuous sheet wound in roll form.

When receiving a print command from the PC 1 or the like, the printer 2 executes printing based on the print settings included in the received print command. The printer 2 is configured to feed the sheet from the sheet feed tray designated by the print command as the sheet feeding method, convey the sheet, and perform printing on the paper being conveyed.

The printer 2 is configured to sandwich the sheet using a plurality of roller pairs arranged in the sheet conveying path and convey the sandwiched sheet by rotating the rollers. Regardless of the conveyance method, it is difficult to completely eliminate mechanical errors in conveying the sheet in the printer 2, and there is a possibility that so-called a sheet skew or a sheet jam may occur during the conveyance of the sheet. In the printer 2, the faster the sheet conveyance speed is, the higher the possibility of skew and jam is. Further, the faster the sheet conveyance speed is, the larger the amount of sheet skew is, if it occurs.

Hereinafter, processes performed by the printer driver 23 according to the present embodiment will be described. Each processing step of the following process and flowchart basically indicates processing of the CPU 11 according to the instructions described in the printer driver 23. In other words, processes of "determining," "extracting," "selecting," "calculating," "deciding," "specifying," "acquiring," "receiving," "controlling," and the like in the following description represent the processing of the CPU 11. The processing by the CPU 11 includes hardware control using an API of the OS 21 of the PC 1. In the following description, the operation of each program is described with omitting the description of the OS 21. That is, in the following description, a statement such as "program B controls hardware C" may refer to "program B controls hardware C using the API of OS 21. Further, the processing of the CPU 11 according to the instructions described in the program may be described in simplified wording. For example, expressions such as "the CPU 11 performs . . . " or "the program performs . . . " may be used.

It is noted that a term "obtain" is used in a concept that does not require a "request." In other words, the process of obtaining data without a request by the CPU 11 is also included in the concept of "obtain data by the CPU 11." It is further noted that "data" in this specification is represented by a computer-readable bit string. Data having the same substantive meaning content but different formats will be treated as the same data. The same applies to "information" in this specification. In addition, "requesting" and "indicating" are concepts that indicate that information indicating what is being requested or indicated is to be output to the other party. The information indicating that it is being requested or instructed is also described simply as "requesting" or "indicating."

Further, in the following description, a process in which the CPU 11 determines whether information A indicates a matter B or not may be described conceptually as "determining whether it is a matter B or not based on information A." Furthermore, a process in which the CPU 11 determines whether information A indicates a matter B or a matter C may be conceptually described as "determining whether it is a matter B or a matter C based on information A."

Figure 2A:
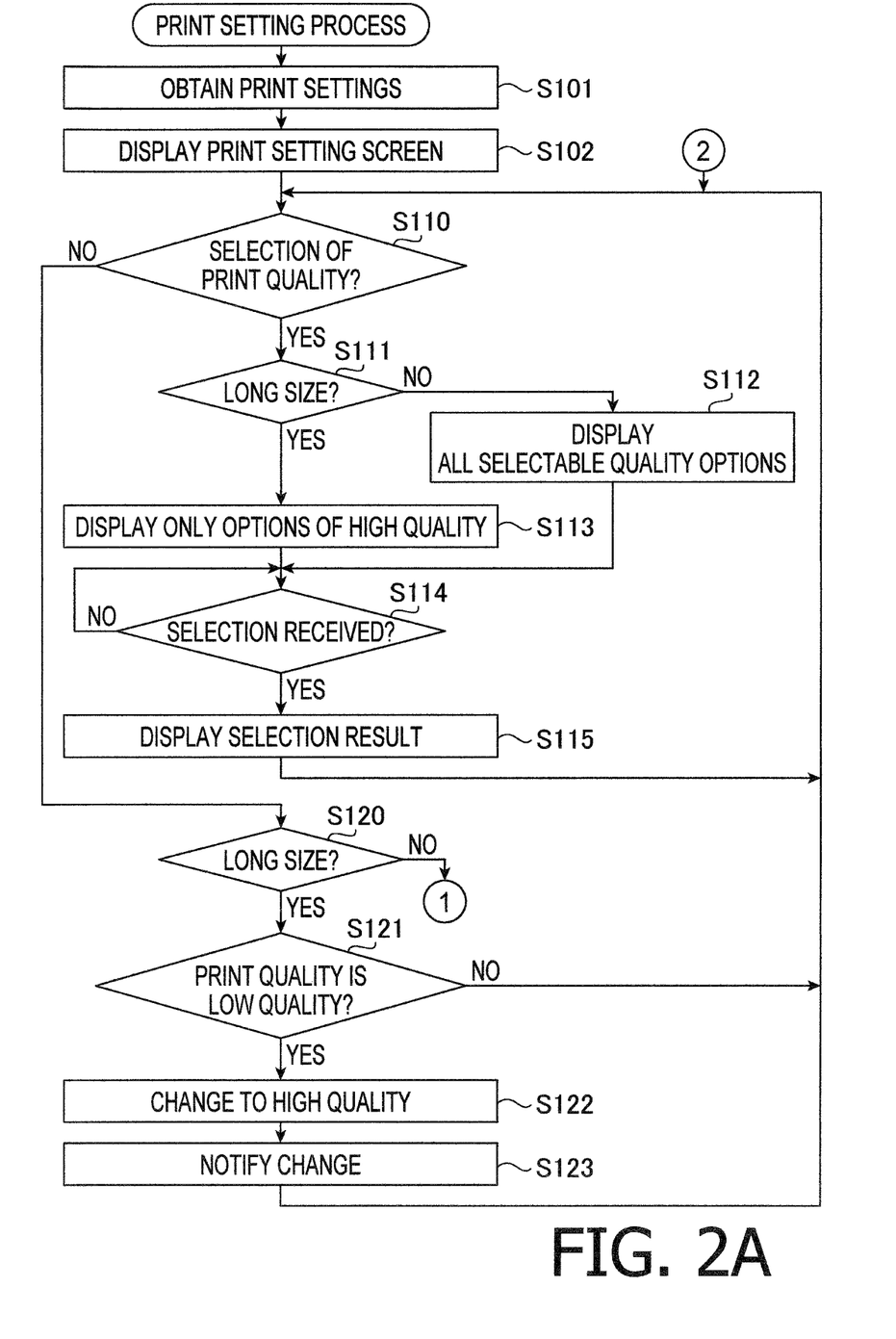
FIGS. 2A and 2B are a flowchart illustrating a print setting process according to the present embodiment.
Figure 2B:
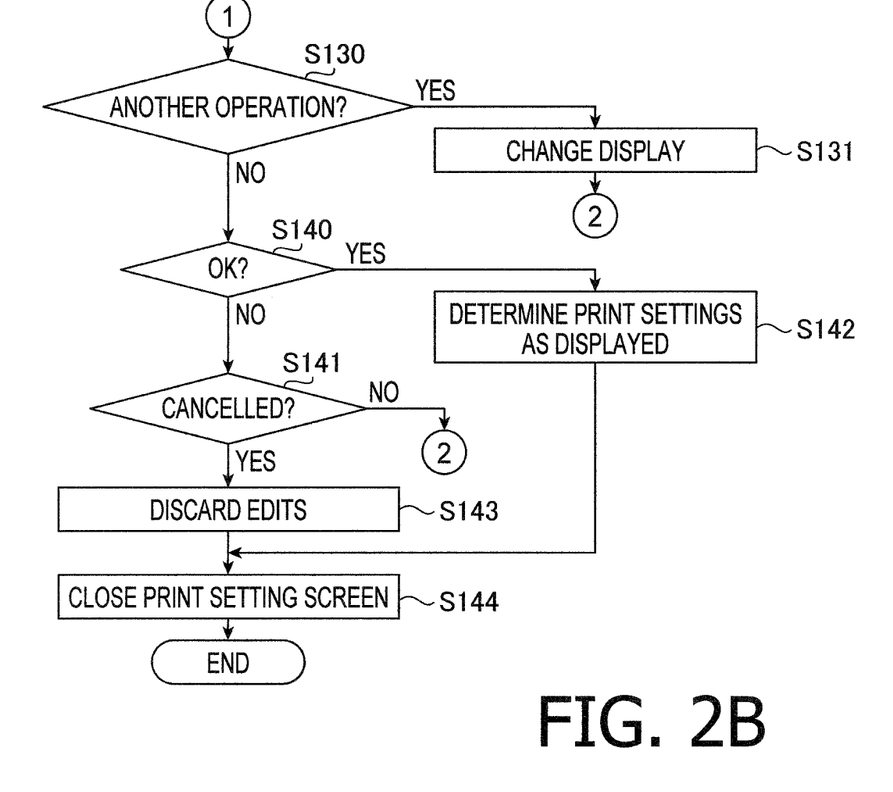

A print setting process performed by the printer driver 23 will be described with reference to a flowchart shown in FIG. 2. The print setting process is performed by the CPU 11 of the PC 1 in a state where the printer 2 is selected by the printing application 22 or other application, and in response to receipt of the instruction for editing the print settings. When the printer driver 23 has been started in advance, the printing application 22 or the like instructs the printer driver 23, which is being executed, to start performing the print setting process.

The CPU 11 first obtains the print settings currently selected (S101). When the printer driver 23 is started, the CPU 11 retrieves the print settings stored in a storage area, for the printer driver 23, in the memory 12 and stores the retrieved print settings in a particular data structure. This data structure is an area shared by applications such as the printing application 22 or the like, and by the printer driver 23, and may be edited by either the printing application 22 or the like, or by the printer driver 23. The data structure is an area that is temporarily used only when the application such as the printing application 22 is being executed and will be discarded when the application is terminated. In S101, the CPU 11 retrieves the print settings stored in the data structure. In the subsequent processes, the CPU 11 refers to and edits the retrieves print settings.

It is noted that the storage area for the printer driver 23 is an area that is defined when the printer driver 23 is installed in the PC 1, and is, for example, a registry or an area in which a setting file is stored. The storage area for the printer driver 23 is an area that is retained regardless of the execution status of applications such as printer driver 23 or the printing application 22, and is used permanently. When the printer driver 23 is installed, each of the installer of the printer driver 23, the OS 21, the printer driver 23 immediately after installed in the PC 1 and the like stores various pieces of information in the storage area. As the information stored in the storage area for the printer driver 23, there is information including, for example, the print settings, the model information, and there exists information that is edited after installed to the PC 1.

The CPU 11 displays a print setting screen showing the print settings obtained in S101 on the user IF 13 (S 102). In other words, the print setting screen displayed in S 102 shows default print settings of the printer driver 23 or the print settings received by the application such as the printing application 22. The print settings include multiple items, and one parameter is set for each item.

Figure 3:
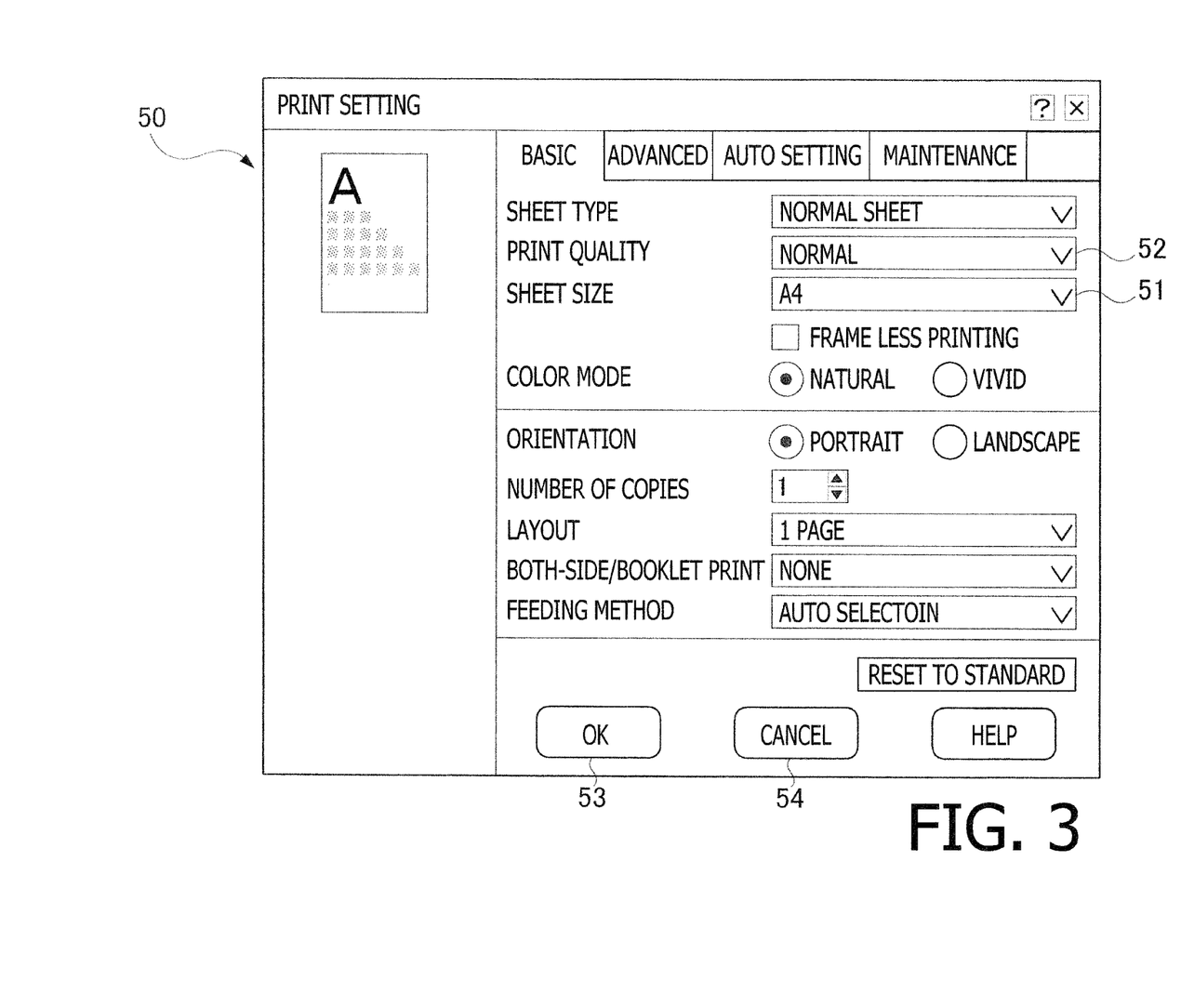
FIG. 3 shows an example of a print setting screen.

An example of the print setting screen is shown in FIG. 3. The print setting screen 50 shown in the example of FIG. 3 includes a sheet size selection field 51, a print quality selection field 52, an OK button 53, and a cancel button 54. The CPU 11 receives operations on each selection field or each button displayed on the print setting screen 50, and edits the print settings based on the received operations.

Figure 4:
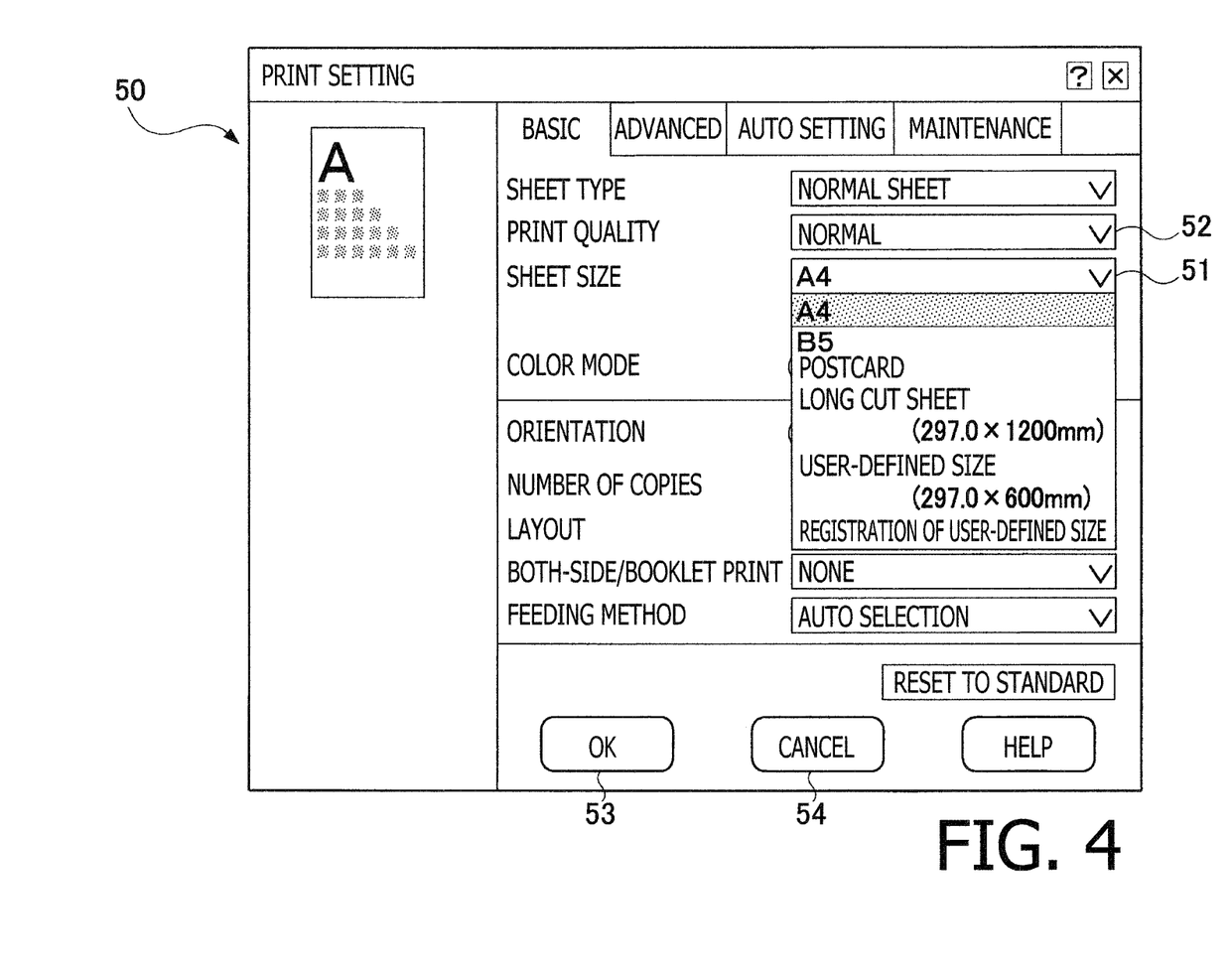
FIG. 4 shows an example of the print setting screen during selecting of a sheet size.

For example, when an operation to the sheet size selection field 51 is received, the CPU 11 displays a plurality of options that can be selected as the sheet size, as shown in FIG. 4, for example, and receives a selection from the options which are being displayed. Each option displayed when the operation to the sheet size selection field 51 is received is each parameter that can be set for the sheet size item.

Options regarding the selectable sheet sizes displayed on the print setting screen 50 are, for example, multiple sheet sizes including the standard size of the cut sheet such as the A4 size, the B5 size, and the like, and the sheet size including a long cut sheet that has the same sheet width as the standard size but the longer sheet length than the standard size. If there is a user-defined sheet size that has already been registered, the size is also displayed as one of selectable sizes. The selectable options may become available in the printer driver 23 in advance, or may be obtained from the printer 2 in response to inquiries thereto. Since the sheet size setting is received from among multiple options including the standard size, it becomes easier for the user to select the sheet size.

According to the present embodiment, if the options regarding the sheet size include an option to receive registration of a user-defined size as a selectable option, and the option is selected, the CPU 11 receives, via the user IF 13, numerical input of the sheet length and the sheet width as the concrete sheet size. The printer driver 23 stores a range of the sheet sizes that can be accepted as the user-defined sizes in advance, and receives numerical values within the range. The receivable sheet width is the range of the width that can be conveyed in the printer 2.

Figure 5A:
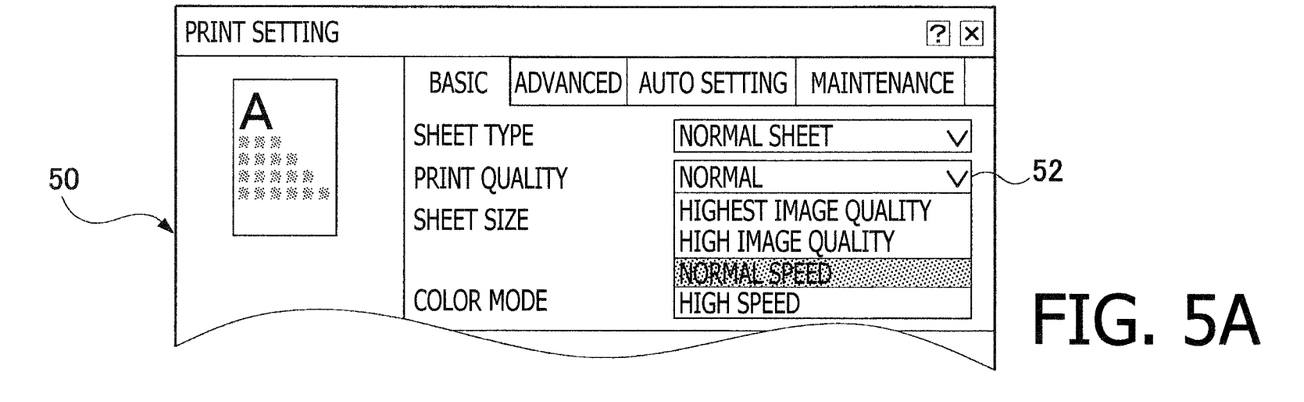
FIGS. 5A and 5B show examples of the print setting screen during selecting of a print quality.
Figure 5B:
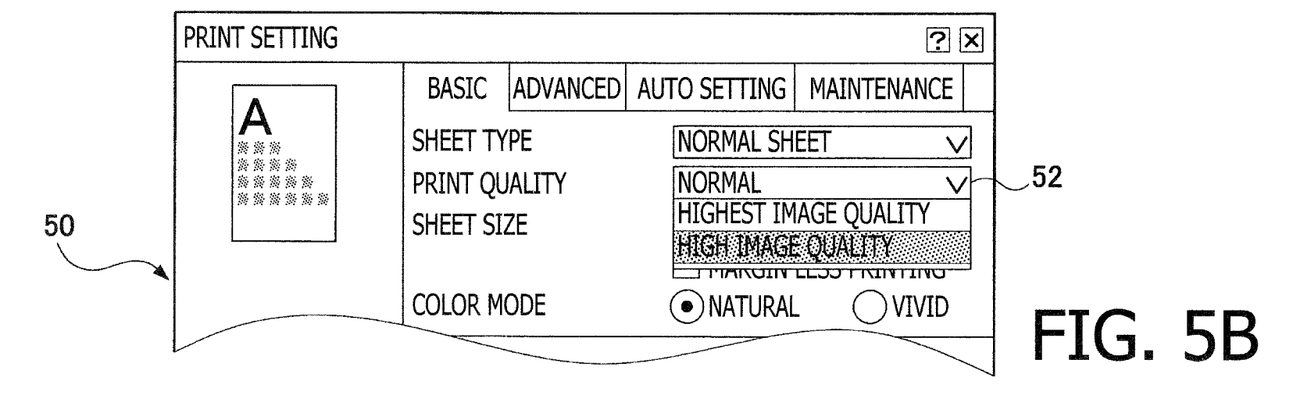

For example, when a print quality selection field 52 is operated, the CPU 11 displays, for example, a plurality of selectable options which can be selected as options regarding the print quality as shown in FIG. 5, and the CPU 11 receives the selection from among the displayed options. The print quality options include, for example, the highest image quality, a high image quality, a normal speed, and a high speed, in the order of the print quality. It is noted that each option displayed when the operation to the print quality selection field 52 is received is a parameter that can be set to the print quality item. It is noted that the "normal speed" is an option indicating a printing in a standard image quality and at a normal speed. It is noted that each of the "highest image quality" and the "high image quality" is an option indicating that a printing is executed in image qualities higher than the printing in the normal speed with reducing the conveyance speed. It is noted that the "high speed" is an option indicating that a high-speed printing is realized by reducing the image quality.

The printer 2 conveys the sheet at a different conveyance speed according to the print quality parameters included in the print settings of the received print job. For example, when the high speed or the normal speed is set as the print quality, the printer 2 conveys the sheet at a faster conveyance speed than a case where the high image quality or the highest image quality is set as the print quality. Since a slower conveyance speed enables fine printing, the printer 2 is configured to slow down the conveyance speed when executing a print job in which a higher quality printing is designated.

The CPU 11 determines whether the operation, on the print setting screen 50, to the print quality selection field 52 is received (S110). When it is determined that the operation is received (S110: YES), the CPU 11 determines whether the sheet size currently selected in the sheet size selection field 51 is the long size (S111).

The CPU 11 determines that the selected sheet size is the long size when the sheet length of the currently selected sheet size is longer than the maximum sheet length among the sheet lengths of the standard sizes. According to the present embodiment, the largest standard size on which the printer 2 can print is a Ledger size, and the sheet length of the Ledger size is 431.8 mm. That is, the maximum sheet length among the sheet lengths of the fixed sizes is 431.8 mm. When the sheet length of the selected sheet size is longer than 431.8 mm, such as the long cut sheet, or when the selected sheet size is a user-defined size, the CPU 11 determines that the selected sheet size is the long size. When the user-defined size is selected, the sheet length of the selected sheet size is a value entered by the user and may be longer than 431.8 mm. It is noted that 431.8 mm is an example of a particular length.

When it is determined that the currently selected sheet size is not the long size (S111: NO), the CPU 11 displays all of the options (e.g., the highest image quality, the high image quality, the normal speed, the high speed) for the print quality options on the user IF 13 (S112) as shown in FIG. 5A.

On the other hand, when it is determined that the currently selected sheet size is the long size (S111: YES), the CPU 11 displays the options of the highest image quality and the high image quality on the user IF 13 as the print quality options, as shown in FIG. 5B (S113). By not displaying the normal speed or the high speed as the print quality options, the user can recognize that such options cannot be selected as the print quality parameters.

A sheet skew and a sheet jam are more likely to occur when the sheet conveyance speed is higher. In other words, an effectiveness level (i.e., effectivity) of prevention of the sheet skew or the sheet jam is higher for a print setting with a slower conveyance speed than for a print setting with a faster conveyance speed.

It is noted that the effectiveness level at which abnormalities associated with sheet conveyance are prevented when printing is performed at a print setting with a fast conveyance speed is an example of a first effectiveness level, and an effectiveness level at which abnormalities associated with sheet conveyance are prevented when printing at a print setting with a slow conveyance speed is an example of a second effectiveness level. An operation mode (a printing mode) in which a print setting with the fast conveyance speed is set is an example of a first mode, while an operation mode (a printing mode) in which a print setting with a slow conveyance speed is set is an example of a second mode. For example, in the first mode in which the first effectiveness level is set, all of the options (e.g., the highest image quality, the high image quality, the normal speed, the high speed) are displayed as the print quality options. Further, in the second mode in which the second effectiveness level is set, the highest image quality and the high image quality are displayed as the print quality options.

In the present embodiment, the conveyance speed of the sheet is determined in accordance with the parameters of the print quality. Thus, the item of the print quality is an example of a particular item. The conveyance speed of the sheet at the time of printing when the print quality parameter is the normal speed or the high speed is an example of a first speed. The conveyance speed of the sheet at the time of printing when the print quality parameter is the highest image quality or the high image quality is an example of a second speed. The highest image quality and the high image quality are examples of a second quality, and the highest image quality or the high image quality set to the print quality items are examples of a second parameter. On the other hand, the normal speed and the high speed are examples of the first quality, and the parameters of the normal speed or the high speed set to the print quality items are examples of the first parameter.

When the sheet skew has occurred during printing, the amount of misalignment in a sheet width direction between the leading end and the trailing end of the sheet tends to be larger as the sheet length is longer. In addition, the longer the sheet length is, the longer the time from the start to the end of sheet conveyance is, and the greater the possibility of a sheet jam is. In the present embodiment, when the sheet length is longer than the particular length, the CPU 11 does not display the parameters of the normal speed or the high speed for the print quality items as options. In other words, the printer driver 23 according to the present embodiment restricts the selectable options of print settings with the that conveyance speed by limiting the parameters that can be selected as the print quality to the highest image quality or high image quality when the printing is performed on the long size sheet.

In the present embodiment, when the selected sheet size is the user-defined size, the sheet size is determined to be the long size in S111, and the print quality parameters that can be selected are restricted. Since the sheet length of the user-defined size can be freely selected by the user, the sheet size could be a long size. Therefore, in the present embodiment, when the sheet size is the user-defined size, the CPU 11 suppresses abnormalities during the sheet conveyance by restricting the selectable print quality to the print quality corresponding to the slow conveyance speed. Even if the sheet size is the user-defined size, when the sheet length is not longer than a particular length, the CPU 11 may determine that the sheet size is not the long size.

After execution of S112 or S113, the CPU 11 determines whether a selection from the displayed options has been received (S114). When it is determined that the selection has not been received (S114: NO), the CPU 11 waits until the selection is received. When it is determined that the selection is received (S114: YES), the CPU 11 displays the selection result (i.e., the selected parameter) in the print quality selection field 52 (S115).

When it is determined that no operation to the print quality selection filed 52 on the displayed print setting screen 50 is received (S110: NO), the CPU 11 determines whether the sheet size currently selected in the sheet size selection field 51 is the long size (S120). The CPU 11 makes the determination of S120 based on, for example, the sheet size information included in the print settings obtained in S101. Further, the CPU 11 is configured to receive an operation in the sheet size selection field 51, and also make the determination of S120 when, for example, the CPU 11 receives the user's selection from the displayed options as illustrated in FIG. 4.

When the CPU 11 determines that the sheet size is the long size (S120: YES), the CPU 11 further determines whether the print quality currently selected in the print quality selection field 52 is the low quality, that is, whether or not the conveyance speed is the normal speed or the high speed (S121). In a case where the CPU 11 determines that the low quality is selected as the print quality (S121: YES), the CPU 11 changes the print quality selection to the high quality (S122). It is noted that the high quality is either the highest image quality or the high image quality, and in S122, the CPU 11 changes the image quality to, for example, the high image quality. Next, the CPU 11 notifies the user that the print quality has been changed (S123). The CPU 11 makes a notification, for example, by displaying a notification message on the user IF 13. The notification may be made by means of an audio message.

When it is determined that the sheet size currently selected in the sheet size selection field 51 on the currently displayed print setting screen 50 is not the long size (S120: NO), the CPU 11 determines whether another operation is received (S130). Another operation is any one of operations to items other than the items in the sheet size selection field 51 and the print quality selection field 52 on the print setting screen 50. When it is determined that another operation is received (S130: YES), the CPU 11 changes the display of the print setting screen 50 based on the received operation (S131).

After execution of any of S115, S123 and S131, or when it is determined that the print quality is not the low quality (S121: NO), the CPU 11 returns to S110 to receive further operations on the print setting screen 50 currently displayed.

When the CPU 11 determines that no other operation is received S130: NO), the CPU 11 determines whether an operation to the OK button 53 is received (S140). When it is determined that the operation to the OK button 53 is not received (S140: NO), the CPU 11 determines whether an operation to the cancel button 54 is received (S141). When it is determined that the operation to the OK button 53 or the cancel button 54 has not been received (S141: NO), the CPU 11 returns to S110 and receives further operations on the print setting screen 50 currently displayed.

When the CPU 11 determines that the operation to the OK button 53 is received (S140: YES), the CPU 11 determines that the print settings are the contents which are being displayed (S142) and writes the determined print settings to the data structure. It is noted that the CPU 11 may store the determined print settings in the storage area for the printer driver 23.

When the CPU 11 determines that the operation to the cancel button 54 is received (S 141: YES), the CPU 11 discards all edits received on the print setting screen 50 (S143). That is, the CPU 11 does not write the edited print settings to the data structure or the storage area for the printer driver 23, and discards the information resulting from the editing. After execution of S142 or S143, the CPU 11 closes the print setting screen 50 (S144) and terminates the print setting process.

In a case where the print setting process is executed by the CPU 11 as a result of the printer driver 23 being started from the printing application 22 or the like, the data structure is retained until the printing application 22 or the like is terminated even after the print setting process is terminated after execution of S144. The printing application 22 or the other application receives various instructions that can be received and processed by the application after receiving a notification of the termination of the print setting process by the printer driver 23.

Among the printing application 22 or the like, there are applications capable of receiving and processing the print quality settings. When the printing application 22 or the like receives an instruction from the user to set the print quality, the printing application 22 or the like inquires the printer driver 23 for selectable options. In such a case, the printer driver 23 performs a process the same as the print setting process, and transmits, as a response, the print quality options based on the sheet size information included in the print settings. Specifically, when the sheet size is the long size, only the highest image quality and the high image quality are transmitted as a response, otherwise, all the qualities are transmitted as a response.

The printing application 22 or the like may also receive and process instructions to execute printing without receiving instructions to edit the print settings. When the printing application 22 or the like receives the instruction to execute printing using the printer 2, the printer driver 23 is also started. In this case, the printer driver 23 may change the print quality to, for example, the high quality before generating a print job when the sheet size included in the print settings is the long size and the low quality is selected as the print quality parameter. Also in this case, the printer driver 23 may inform the user that the print quality has been changed.

The printer driver 23 may perform the print setting process not only when the printer driver 23 receives instructions from the printing application 22 or the like, but also when the printer driver 23 receives instructions for editing the print settings from, for example, the OS 21, or related tools provided by the manufacturer of the printer driver 23. In such a case, the CPU 11 stores the print settings determined in S142 in the storage area for the printer driver 23. In other words, the print settings after editing become permanent settings. In addition, the OS 21 or various related tools and applications may store the edited print settings in the storage area for the printer driver 23.

As described in detail above, with the printer driver 23 according to the first embodiment, when the sheet length included in the sheet size is the longer size which is longer than a particular length, the range that can be selected as a parameter of the print quality is limited to the high quality range (e.g., the highest image quality or the high image quality). When the print quality is the high quality, the sheet conveyance speed becomes lowered, and thus the sheet skew and the sheet jam can be prevented at a higher effectiveness level (i.e., more effectively) in comparison with a case where the print quality is the low quality. The printing on the long size sheet tends to be more affected by the sheet skew and the sheet jam than the printing on the sheet that is not the long size sheet. However, by limiting the printing settings to those that prevent the sheet skew and the sheet jam at a high effectiveness level (i.e., more effectively), the occurrence of abnormalities associated with the sheet conveyance can be reduced, thereby increasing reliability when printing on the long sheets.

Further, since the printer driver 23 according to the present embodiment limits the print quality that can be selected in the case of a long size sheet to the highest image quality or the high image quality, it becomes possible to cause the printer 2 to perform printing at a slower conveyance speed even if the conveyance speed cannot be explicitly selected. Such a feature is also preferable for the user because the print quality is not degraded.

Next, a second embodiment will be described in detail with reference to the accompanying drawings. In the second embodiment, a printer driver 23 which has the same configuration as in the first embodiment, and is executed on the PC 1 will be described.

When the print quality is the low quality, the sheet conveyance speed is high, and the possibility of the sheet skew is larger than in a case where the conveyance speed is low. When the sheet skew occurs during the printing by the printer 2, the longer the sheet length is, the greater the possibility that the amount of image misalignment due to skewing will be and there is a possibility that a part of the image protrudes from the left and right ends of the sheet. The printer driver 23 according to the present embodiment limits a minimum print margin that can be set so that the image does not protrude from the sheet even if the sheet skew occurs.

Figure 6:
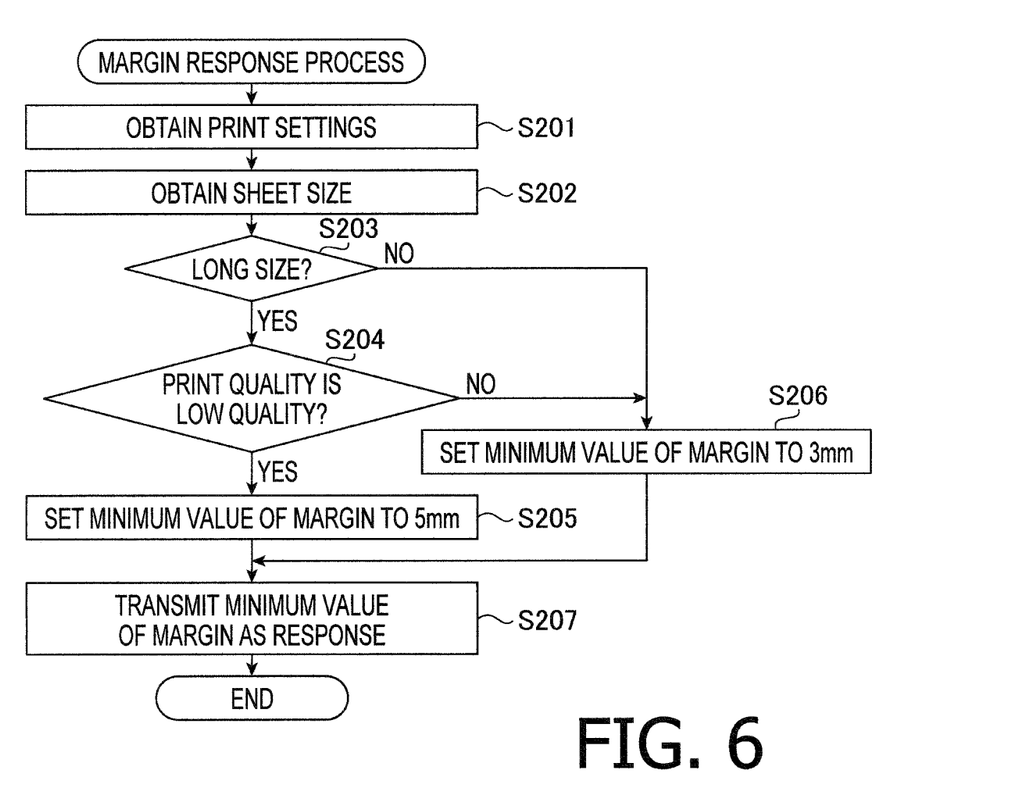
FIG. 6 is a flowchart illustrating a margin response process.

A procedure of a margin response process performed by the printer driver 23 according to the second embodiment is described with reference to the flowchart shown in FIG. 6. The margin response process is executed by the CPU 11 of the PC 1 in response to the printer driver 23 being started in response to receipt of an inquiry from the printing application 22 or the like for the minimum value of the print margin. If the printer driver 23 has been started beforehand, the printing application 22 or the like instructs the printer driver 23, which is running, to start performing the margin response process.

The printing application 22 or the like inquires the printer driver 23 for the minimum value of the margin that can be set when, for example, the printing application 22 or the like receives an instruction from the user to set the print margin. Based on the response from the printer driver 23, the printing application 22 or the like receives the setting of values within the range equal to or greater than the respective minimum values for the margins to be set to the top, bottom, left and right of the image, and generates image data for printing using the set print margin values.

In the margin response process, the CPU 11 first obtains the print settings that are currently set (S201). The information of the print settings may be obtained, for example, from a data structure shared by the printing application 22 or the like and the printer driver 23, or may be received from the printing application 22 or the like when making an inquiry, or may be obtained as the printer driver 23 makes an inquiry to the printing application 22.

The CPU 11 obtains information on the sheet size included in the obtained print settings (S202). Then, the CPU 11 determines whether the obtained sheet size is the long size (S203). It is noted that the process in S203 is the same as in S111 and S120 of the print setting process.

When it is determined that the sheet size is the long size (S203: YES), the CPU 11 determines whether the parameter set in the print quality item included in the print settings obtained in S201 is the low quality parameter (S204). It is noted that the process in S204 is the same process as the process in S121 of the print setting process.

When the CPU 11 determines that the sheet size is the long size and the parameter for low quality is set in the print quality item (S204: YES), the CPU 11 sets the minimum value of the left and right margins to 5 mm (S205). For the top and bottom margins, the default minimum values may be used as they are.

On the other hand, when the CPU 11 determines that the sheet size is not the long size (S203: NO) or that the parameter set in the print quality item is not the low quality parameter (S204: NO), the CPU 11 sets the minimum value of the left and right margins to 3 mm (S206).

After execution of S205 or S206, the CPU 11 responds to the printing application 22 or the like by transmitting the determined minimum value of the margins (S207) and terminates the margin response process. Based on the minimum value of the margins received from the printer driver 23, the printing application 22 or the like receives the setting of the margins with a value equal to or larger than the minimum value. Since the printing application 22 or the like receives the margin settings based on the response from the printer driver 23, the printer driver 23 can limit the range of margins that can be set according to the sheet length.

In the printer 2 according to the present embodiment, even if the sheet is conveyed at the conveyance speed when the print quality is set to the normal speed, the maximum amount of left-right error is about 1 mm if the sheet size is within the range of the standard size, and accordingly, it is sufficient that each of the left and right margins is 3 min or more. However, if the sheet length is, for example, 1,200 mm, the mechanical error range when the sheet is conveyed at the conveyance speed with the print quality is set to the normal speed may be up to 4 mm. In the present embodiment, when the sheet size is the long size and the print quality is the low quality, the minimum value of the left and right margins is increased so that the margins larger than the minimum value are set. Therefore, even if the skewing occurs, a possibility of the image protruding from the sheet can be reduced.

A print setting with the large print margins can prevent image overflow (protrusion) at a higher effectiveness level (i.e., more effectively) than a print setting with the small print margins. The print setting with the small print margins is an example of a first mode that prevents image overflow at a first effectiveness level, and the print setting with the large print margins is an example of a second mode that prevents image overflow at a second effectiveness level, which is higher than the first effectiveness level. When the minimum print margin is a large value, the print margin setting is limited to a large value because a small value is not allowed. The minimum value of the print margin is an example of a specific item. Among the parameters set for the minimum value of the print margin, 3 mm is an example of the first parameter corresponding to the first mode in which image overflow is prevented at the first effectiveness level, and 5 min is an example of the second parameter corresponding to the second mode in which image overflow is prevented at a second effectiveness level higher than the first effectiveness level.

In the printer 2 according to the present embodiment, if the conveyance speed is set to the speed for the speed when the print quality is set to the high image quality, the maximum mechanical error range is about 1.5 mm even when conveying a sheet of which sheet length is 1,200 mm, and a margin of 3 mm or more is sufficient. The printer driver 23 does not limit the size of the left and right margins unless the print quality is the low quality. Therefore, the sizes of the margins are not restricted more than necessary.

The printing application 22 or the like may also receive the instruction to execute printing without receiving the instruction to set the margins. When the printing application 22 or the like receives an instruction to execute the printing with the printer 2, the printer driver 23 is also started. When the printer driver 23 receives an instruction to execute the printing with a print setting where the sheet size included in the print setting is the long size, the low quality is selected as the print quality parameter, and the margin is smaller than 5 mm, the printer driver 23 may notify the printing application 22 or the like that, for example, the margin is too small before generating a print job. Based on the notification, the printing application 22 or the like may, for example, display a screen to receive the margin re-setting and receive a value of 5 mm or more as each of the left and right margins.

As described in detail above, the printer driver 23 according to the second embodiment limits the minimum print margin to a larger value when the sheet length included in the sheet size is the long size which is longer than a particular length. If a large margin is set, even if the sheet skew occurs during sheet conveyance, the image overflow can be prevented at a high effectiveness level (i.e., effectively) in comparison with a case where the margin is small.

When the printing is performed on the long size sheet, the sheet skew may tend to affect more than in a case where the printing is performed on the sheet that does not have the long size. However, by limiting the print settings to those that prevent the sheet skew at the high effectiveness level, occurrence of abnormalities associated with the sheet conveyance can be suppressed, and the reliability when the printing is performed on the long sheet is enhanced.

The first and second embodiments are merely examples and are not intended to limit aspects of the present disclosures in any way. Therefore, the present disclosures can be improved or modified in various ways within aspects of the present disclosures. For example, the printer 2 is not necessarily limited to a device with a single printing function, but may be, for example, a device with a document reading function and a facsimile transmitting/receiving function. The present embodiment can also be applied to a PC 1 connected to a multifunctional machine, a copier, a facsimile machine and the like instead of the printer 2. Further, two or more printers may be connected to the PC 1.

The printer driver 23 may be configured to perform both the print setting process according to the first embodiment and the margin response process according to the second embodiment. Further, the printer driver 23 may also be configured to receive user settings for whether or not to apply each of the print setting process and the margin response process.

In the first embodiment, the slow speed of the conveyance speed is determined based on the parameters of the print quality. Such a configuration may be modified to receive direct settings for the conveyance speed. For example, the print setting screen 50 may have an item for selecting the sheet conveyance speed. In addition, the conveyance speed is not limited to two types, but may be more types. In such a case, the selectable conveyance speeds may be determined according to the sheet length.

For example, in the first embodiment, the print quality is automatically changed to the high quality when the print quality is the low quality and the sheet size is changed to the long size (S120: YES). However, such a condition may be modified. For example, a message indicating that changing to a higher quality will prevent the sheet skew and the sheet jams may be displayed to receive the user's approval for changing the print quality. Further, according to the above-described embodiments, when the change is made automatically, the user is notified that the change has been made. However, it is not necessary to notify the user of the automatic change even when the change has been made.

In the first embodiment, every time the sheet size is changed, whether the sheet size is the long size is determined. Such a configuration may be modified to make a determination based on the print setting currently displayed when, for example, an operation to the OK button 53 is received.

In the second embodiment, the minimum value of the print margin is increased when the size is the long size and the print quality is the low quality. However, the configuration may be modified such that, for example, the minimum print margin may be increased when the size is the long size regardless of the print quality.

In the first and second embodiments, the process is described as a process performed by the printer driver 23. It is noted that the program is not necessarily limited to the printer driver. Aspects of the present disclosures may be applied to a PC having a so-called driverless configuration (i.e., a PC in which an OS equipped with a general-purpose printing program is installed) instead of the printer driver. The present disclosures may be applicable, for example, to a program related to printing that is incorporated in a PC separately from a general-purpose printing program, or a program configured to receive the print settings in cooperation with a general-purpose printing program.

In any flowchart disclosed in each embodiment, a plurality of processes performed in any plurality of steps may be arbitrarily changed in the order of execution, or executed in parallel, to the extent that there is no inconsistency in the processing content.

The processing disclosed in each embodiment may be executed by a single CPU, multiple CPUs, hardware such as an ASIC, or a combination thereof. In addition, the processing disclosed in each embodiment may be realized in various forms, such as a non-transitory computer-readable recording medium that records a program (i.e., computer-executable instructions) causing, when executed by the CPU or the like, the information processing apparatus to perform the processing, or a method.

It is noted that the PC 1 is an example of an information processing apparatus according to aspects of the present disclosures. The information processing apparatus may be a smartphone or a tablet computer instead of the PC 1. Further, the CPU 11 is an example of a computer according to aspects of the present disclosures. It is noted that a buffer provided to the CPU 11 is an example of a memory according to aspects of the present disclosures. The printer driver 23 is an example of a program according to aspects of the present disclosures. The sheet skew and the sheet jam are examples of abnormalities associated with the conveyance of the sheet, according to aspects of the present disclosures.

A process in S101 is an example of an obtaining process according to aspects of the present disclosures. The screen displaying the sheet size options, as shown in FIG. 4, is an example of a first setting screen according to aspects of the present disclosures.

It is noted that a process in S111 is an example of an obtaining process according to aspects of the present disclosures. It is noted that 431.8 mm is an example of a particular length according to aspects of the present disclosures. It is noted that a process in S113 is an example of a limiting process according to aspects of the present disclosures.

As in the example shown in FIG. 5B, the screen that displays only the parameters of the high image quality as options for the print quality is an example of the second setting screen according to aspects of the present disclosures.

It is noted that a process of S114 is an example of the setting process according to aspects of the present disclosures. It is noted that a process in S120 is an example of an obtaining process according to aspects of the present disclosures. It is noted that the process of S122 is an example of a limiting process according to aspects of the present disclosures.

The image protrusion is an example of an abnormality associated with the sheet conveyance according to aspects of the present disclosures. The process in S201 is an example of the obtaining process according to aspects of the present disclosures. It is noted that 5 mm is an example of a second width according to aspects of the present disclosures. Further, a process in S205 is an example of a limiting process according to aspects of the present disclosures. It is noted that 3 mm is an example of a first width according to aspects of the present disclosures.

What is claimed is:

1. A non-transitory computer-readable recording medium of an image processing apparatus that includes a controller, the recording medium storing instructions which can be executed by the controller, the instructions causing, when executed by the controller, the information processing apparatus to perform:

obtaining print settings to be used in printing by a printer, the print setting including a sheet size and a particular item, the sheet size including a sheet length representing a size in a sheet conveyance direction of a sheet in the printer, a parameter that can be set to the particular item including a first parameter corresponding to a first mode in which an abnormality in a conveyance of the sheet in the printer is prevented at a first effectiveness level and a second parameter corresponding to a second mode in which the abnormality in the conveyance of the sheet in the printer is prevented at a second effectiveness level which is higher than the first effectiveness level; and limiting the parameter to be set to the particular item to the second parameter in a case where the sheet length included in the sheet size among the print settings as obtained is longer than a particular length; and not limiting the parameter to be set to the particular item to the second parameter in a case where the sheet length included in the sheet size among the print settings as obtained is not longer than the particular length.

2. The recording medium according to claim 1,
wherein the instructions causes, when executed by the controller, the information processing apparatus to further perform:

obtaining the print settings including the particular items to which the first parameter corresponding to the first mode and the second parameter corresponding to the second mode can be set, a conveyance speed of a sheet in the printer is set to a first speed in the first mode, the conveyance speed of the sheet in the printer being set to a second speed slower than the first speed;

limiting the parameter to be set to the particular item to the second parameter making the conveyance speed of the sheet in the printer to the second speed in a case where the sheet length included in the sheet size among the print settings as obtained is longer than the particular length; and not limiting the parameter to be set to the particular item to the second parameter in a case where the sheet length included in the sheet size among the print settings as obtained is not longer than the particular length.

3. The recording medium according to claim 2,
wherein the instructions causes, when executed by the controller, the information processing apparatus to further perform:

obtaining the print settings including the particular items to which the first parameter corresponding to the first mode in which a print quality is set to a first quality and second parameter corresponding to the second mode in which the print quality is set a second quality which is a higher quality than the first quality, the printer setting the conveyance speed of the sheet to the first speed when the first quality is set to the particular item, the printer setting the conveyance speed of the sheet to the second speed when the second quality is set to the particular item;

limiting the parameter to be set to the particular item to the second parameter making the print quality to the second quality in a case where the sheet length included in the sheet size among the print settings as obtained is longer than the particular length; and not limiting the parameter to be set to the particular item to the second parameter in a case where the sheet length included in the sheet size among the print settings as obtained is not longer than the particular length.

4. The recording medium according to claim 1,
wherein the instructions causes, when executed by the controller, the information processing apparatus to further perform:

obtaining the print settings including the particular items to which a print margin can be set, a minimum value of the print margin set as the first parameter being a first width in the first mode, a minimum value of the print margin set as the first parameter being a second width which is smaller than the first width in the second mode;

limiting a minimum value of the print margin to be set to the particular item to the second width in a case where the sheet length included in the sheet size among the print settings as obtained is longer than the particular length; and not limiting a minimum value of the print margin to be set to the particular item to the second width in a case where the sheet length included in the sheet size among the print settings as obtained is not longer than the particular length.

5. The recording medium according to claim 1,
wherein the instructions causes, when executed by the controller, the information processing apparatus to further perform:

displaying a first setting screen configured to receive a setting of the sheet size among the print settings on a user interface of the information processing apparatus;

receiving the setting of the sheet size through an operation on the first setting screen;

obtaining the print setting including the sheet size as received;

limiting the parameter to be set to the particular item to the second parameter in a case where the sheet length included in the sheet size as received on the first setting screen is longer than the particular length; and not limiting the parameter to be set to the particular item to the second parameter in a case where the sheet length included in the sheet size as received on the first setting screen is not longer than the particular length.

6. The recording medium according to claim 5,
wherein the instructions causes, when executed by the controller, the information processing apparatus to further perform:

displaying a plurality of options that can be selected as the sheet size on the first setting screen, the plurality of options including a standard size of a cut sheet;

obtaining the setting of the sheet size by receiving a selection operation of one of the plurality of options;

limiting the parameter to be set to the particular item to the second parameter in a case where the sheet length included in the sheet size corresponding the one of the plurality of options selected on the first setting screen is longer than the particular length; and not limiting the parameter to be set to the particular item to the second parameter in a case where the sheet length included in the sheet size corresponding the one of the plurality of options selected on the first setting screen is not longer than the particular length.

7. The recording medium according to claim 6,
wherein the instructions causes, when executed by the controller, the information processing apparatus to further perform:
displaying the plurality of options on the first setting screen, the plurality of options including a user-defined size in which an numerical input of the sheet size is received through the user interface; and
limiting the parameter to be set to the particular item to the second parameter in a case where the one of the plurality of options selected on the first setting screen is the user-defined size.

8. The recording medium according to claim 1,
wherein the instructions causes, when executed by the controller, the information processing apparatus to further perform:
displaying a second setting screen including at least one parameter option that can be set to the particular item on a user interface of the information processing apparatus;
setting one of the at least one parameter option selected through the user interface to the particular item;
displaying the second parameter on the second setting screen as a parameter option that can be set to the particular item; and
not displaying the first parameter on the second setting screen as a parameter option that can be set to the particular item.

9. The recording medium according to claim 1,
wherein the instructions causes, when executed by the controller, the information processing apparatus to further perform, when receiving an inquiry about a parameter that can be set to the particular item:
responding to the inquiry by transmitting the second parameter and not transmitting the first parameter.

10. The recording medium according to claim 1,
wherein the instructions works as a printer driver registered with an operating system of the information processing apparatus.

11. An information processing apparatus including a controller and configured to communicate with a printer,
wherein the controller is configured perform:
obtaining print settings to be used in printing by a printer, the print setting including a sheet size and a particular item, the sheet size including a sheet length representing a size in a sheet conveyance direction of a sheet in the printer, a parameter that can be set to the particular item including a first parameter corresponding to a first mode in which an abnormality in a conveyance of the sheet in the printer is prevented at a first effectiveness level and a second parameter corresponding to a second mode in which the abnormality in the conveyance of the sheet in the printer is prevented at a second effectiveness level which is higher than the first effectiveness level; and
limiting the parameter to be set to the particular item to the second parameter in a case where the sheet length included in the sheet size among the print settings as obtained is longer than a particular length; and
not limiting the parameter to be set to the particular item to the second parameter in a case where the sheet length included in the sheet size among the print settings as obtained is not longer than the particular length.

* * * * *

UNITED STATES PATENT AND TRADEMARK OFFICE
CERTIFICATE OF CORRECTION

PATENT NO. : 11,354,550 B2
APPLICATION NO. : 17/305726
DATED : June 7, 2022
INVENTOR(S) : Ryota Kakitsuba It is certified that error appears in the above-identified patent and that said Letters Patent is hereby corrected as shown below:

On the Title Page

Item (57), Abstract, Line 2:
Please change: "PC is configured to obtain a print settings used for printing" to -- PC is configured to obtain print settings used for printing --

In the Claims

Column 15, Claim 1, Line 9:
Please change: "the print setting including a sheet size and a particular" to -- the print settings including a sheet size and a particular --

Column 15, Claim 2, Line 30:
Please change: "wherein the instructions causes, when executed by the" to -- wherein the instructions cause, when executed by the --

Column 15, Claim 2, Lines 37-39:
Please change: "in the printer is set to a first speed in the first mode, the conveyance speed of the sheet in the printer being set to a second speed slower than the first speed;" to -- in the printer being set to a first speed in the first mode, the conveyance speed of the sheet in the printer being set in the second mode to a second speed slower than the first speed; --

Column 15, Claim 3, Line 51:
Please change: "wherein the instructions causes, when executed by the" to -- wherein the instructions cause, when executed by the --

Column 15, Claim 3, Line 57:
Please change: "second parameter corresponding to the second mode in" to -- the second parameter corresponding to the second mode in --

Signed and Sealed this
Tenth Day of January, 2023

Katherine Kelly Vidal
*Director of the United States Patent and Trademark Office*

CERTIFICATE OF CORRECTION (continued)
U.S. Pat. No. 11,354,550 B2

Column 16, Claim 4, Line 8:
Please change: "wherein the instructions causes, when executed by the" to -- wherein the instructions cause, when executed by the --

Column 16, Claim 4, Line 15:
Please change: "margin set as the first parameter being a second width" to -- margin set as the second parameter being a second width --

Column 16, Claim 5, Line 29:
Please change: "wherein the instructions causes, when executed by the" to -- wherein the instructions cause, when executed by the --

Column 16, Claim 5, Line 37:
Please change: "obtaining the print setting including the sheet size as" to -- obtaining the print settings including the sheet size as --

Column 16, Claim 6, Line 48:
Please change: "wherein the instructions causes, when executed by the" to -- wherein the instructions cause, when executed by the --

Column 17, Claim 7, Line 2:
Please change: "wherein the instructions causes, when executed by the" to -- wherein the instructions cause, when executed by the --

Column 17, Claim 8, Line 14:
Please change: "wherein the instructions causes, when executed by the" to -- wherein the instructions cause, when executed by the --

Column 17, Claim 9, Line 30:
Please change: "wherein the instructions causes, when executed by the" to -- wherein the instructions cause, when executed by the --

Column 18, Claim 11, Line 11:
Please change: "printer, the print setting including a sheet size and a" to -- printer, the print settings including a sheet size and a --